United States Patent Office 3,070,575
Patented Dec. 25, 1962

3,070,575
PROCESS FOR THE PREPARATION OF POLY-
ESTERS FROM DICARBOXYLIC ACIDS AND
BIS (HYDROXY-ALKYL) ESTERS
Francis Bernard Cramer, Newark, Del., assignor to E. I.
du Pont de Nemours and Company, Wilmington, Del.,
a corporation of Delaware
No Drawing. Filed Jan. 27, 1958, Ser. No. 711,114
14 Claims. (Cl. 260—47)

This invention relates to a chemical process. More specifically it is concerned with a novel and useful process for the production of a synthetic, fiber-forming, linear polyester in which the recurring ester linkages are an integral part of the polymer chain.

It is an object of the present invention to provide a novel and useful process for the preparation of a synthetic, fiber-forming, linear polyester in which the recurring ester linkages are an integral part of the polymer chain, the said process allowing a minimum of side reactions.

The above, and other objects will become apparent in the course of the following specification and claims.

In accordance with the present invention, a synthetic, fiber-forming, linear polyester in which the recurring ester linkages are an integral part of the polymer chain is formed by reacting a bis-(hydroxyalkyl) ester of an aromatic dicarboxylic acid with a dicarboxylic acid in a molar ratio of at least 1.00/0.90, and using at least about 0.1 mole of the said dicarboxylic acid per mole of the said ester, the reaction being carried out in the presence of at least about 0.01 mole percentage based on glycol ester of a basic salt of a metal having an atomic number less than 26, the monomer mixture being polymerized at elevated temperature and under reduced pressure until a fiber-forming polymer is obtained, the said polymerization being done after initial condensation of monomer at atmospheric pressure or below with removal of water until a homogeneous melt is obtained.

The salt referred to above acts, under the conditions specified, to reduce side reactions such as ether formation during the polymerization process. Shaped structures of polyesters containing even minor proportions of ether linkages (such as the diethylene glycol ethers ordinarily formed when polyethylene terephthalate is prepared by ester interchange from dimethyl terephthalate and ethylene glycol) exhibit poor ultraviolet stability, poor hydrolytic stability, poor hot-wet ("wash and wear") properties and accelerated dye fading. This salt may be added as such to the reaction mixture, or it may be formed in situ by addition of a salt-forming compound of the metal. For example, if it is desired to use terephthalic acid as the dicarboxylic acid, then the metal may be added as metal terephthalate or as metal hydroxide.

By an aromatic dicarboxylic acid is meant an acid (including the anhydride and mixtures of different such acids) wherein the two carboxyl groups are linked to the same or different attached aromatic nuclei. By the bis(hydroxyalkyl) ester of an aromatic dicarboxylic acid is meant the diesterification product of an aromatic dicarboxylic acid as above defined with a glycol of the formula $HO(CH_2)_nOH$, where $n$ is an integer greater than 1 but not greater than 10.

The following examples are cited to illustrate the invention. They are not intended to limit it in any manner.

The inherent viscosity, $\eta_{inh}$, is determined at 30.0° C. at a concentration of 0.5 gram per 100 milliliters in a 60/40 mixture of phenol/sym-tetrachloroethane. $\eta_{inh}$ is calculated from the relation $$\eta_{inh} = \frac{\ln \eta_{rel}}{c}$$

where $\eta_{rel}$ is the ratio of flow time for solution to that for pure solvent in a viscometer, and $c$ is the concentration (0.5). In general an inherent viscosity of about 0.3 indicates the product to be of fiber-forming molecular weight. Values of at least 0.4 are generally preferred for toughness in fibers and films.

The ether content (for polyethylene terephthalate) is expressed as mole percent of diethylene glycol terephthalate segments. It is determined in the examples from the crystalline melting points. It is known that pure polyethylene terephthalate has a crystalline melting point of very close to 265.5° C. and that this is depressed about 3° for each mole percent of copolymer ingredient to at least 20 mole percent copolymer. Thus, a depressed melting point corresponds to a certain copolymer composition. For example, a melting point of 253.5° C. for a polymer made only from ethylene glycol and terephthalic acid would have 4 mole percent diethylene glycol units. A polymer made from ethylene glycol, terephthalic acid, and sebacic acid with 98% terephthalic acid and 2% sebacic acid, having the same melting point indicates 2 mole percent diethylene glycol units.

The crystalline melting point is obtained by noting the temperature for the disappearance of the bright image when an annealed polymer sample is observed between crossed polarizing prisms and slowly heated at 3° C. per minute. Annealing is carried out by heating the polymer sample under nitrogen at 180° C. for 30 minutes.

Parts are given by weight.

Example I

The bis(hydroxyethyl) terephthalate monomer used in this example is prepared from dimethyl terephthalate by ester exchange with a large excess of boiling ethylene glycol, using calcium acetate as catalyst (0.11 mole percentage). The product is purified by successive crystallization from water and methanol to remove impurities, catalyst, and inorganic contaminants.

A mixture of 5.08 parts (0.020 mole) of pure bis(hydroxyethyl) terephthalate and 1.66 parts (0.010 mole) of terephthalic acid is heated at 283° C. for ¼ hour. Water is expelled as steam and a clear melt is formed. 0.005 part (0.000017 mole) of antimony trioxide is then introduced as a polymerization catalyst and heating is continued at 283° C., under a pressure of 0.5 mm. of mercury for 2 hours, while nitrogen is bubbled through the melt. The resulting polymer having an inherent viscosity of 0.74 and a crystalline melting point of 259° C. (indicating the presence of 2.2% ethers) forms fibers which are thereafter cold drawn.

A second preparation, run in the same way as recited above except that 0.005 part (0.000028 mole) of calcium acetate monohydrate is added to the monomer, produces a fiber-forming polymer having a crystalline melting point of 263.5° C. (indicating the presence of about 0.7% ethers).

Example II

A mixture of 7.77 parts (0.04 mole) of dimethyl terephthalate, 6.2 parts (0.10 mole) of ethylene glycol and 0.0075 part (0.000031 mole) of manganous acetate tetrahydrate is heated at 197° C. while a slow stream of dry nitrogen is passed through for 4 hours. Methanol distills out rapidly and a clear colorless melt of monomer forms. Thereafter 5.98 parts (0.036 mole) of terephthalic acid is added and the temperature is raised to 265° C. Water vapor is rapidly expelled and, after 2 hours, a clear melt is obtained. Antimony oxide 0.005 part (0.000017 mole) is added and the molten mass polymerized at 283° C. under a pressure of 0.5 mm. of mercury or less for 2½ hours. The final polymer has an inherent viscosity of 0.56 and readily forms cold-drawable fibers. Its crystalline melting point of 263.5° C., indicates 0.7 ethers.

Example III

Example II is modified by the use of 0.0035 part (0.000014 mole) of manganous acetate ester exchange catalyst, 4.98 parts (0.030 mole) of terephthalic acid and 0.004 part (0.000014 mole) of antimony oxide. In this example 0.010 part (0.000073 mole) of sodium carbonate is added with the terephthalic acid. The heating at 265° C. is maintained only for 1¾ hours. The resulting fiber-forming polymer has an inherent viscosity of 0.62 and a crystalline melting point of 263.5° C. (indicating 0.7% ethers).

Example IV

A mixture of 7260 parts (37.4 moles) of dimethyl terephthalate, 5780 parts (93.3 moles) of ethylene glycol, 10.9 parts (0.045 mole) of manganous acetate tretrahydrate, and 4.5 parts (0.015 mole) of antimony trioxide is heated with stirring under a nitrogen atmosphere for 4 hours. During this time methanol and the excess glycol distill out until the melt temperature reaches 220° C. The mass is allowed to cool overnight. After adding 1650 parts (9.95 moles) of solid isophthalic acid, the charge is remelted and heated with stirring for 2½ hours during which water and more glycol distilled out until a temperature of 270° C. is reached, whereupon vacuum is applied, polymerization being completed in 2¾ hours at 270–280° C. under a pressure of 1 mm. of mercury. The copolymeric product has an inherent viscosity of 0.72. Chemical analysis shows a low ether content. The polymer could be readily melt-pressed into clear flexible films which crystallized on drawing at 70° C. The crystalline melting point of the film was 208° C.

Example V

The bis(6-hydroxyhexyl) sulfonyldibenzoate monomer used in this example is prepared by reacting p,p'-sulfonyldibenzoyl chloride with excess hexamethylene glycol in the presence of excess calcium carbonate, and heating the mixture to 70° C. to complete the reaction. The monomer is precipitated from the filtered reaction mixture by dilution with water and is purified by crystallization from hot water.

A mixture of 5.07 parts (0.01 mole) of the monomer and 1.29 parts (0.0075 mole) of hexahydroterephthalic acid is heated at 275° C. for 25 minutes, during which time water distills out. A clear melt is obtained. A vacuum of 15 mm. of mercury is then applied for two minutes to complete the removal of water. Thereafter 0.002 part (0.000072 mole) of antimony trioxide is added, the temperature raised to 283° C. and the pressure reduced to 0.5 mm. of mercury for 1½ hours. The copolyester product has an inherent viscosity of 0.54, softens at 195° C. and can be extended at 215° C. into cold-drawable fibers.

When the procedure recited above is modified by the use of 0.003 part (0.000014 mole) of sodium hexahydroterephthalate as a component of the mixture of monomers, a decrease in ether content is noted.

Example VI 7.17 parts (0.02 mole) of dimethyl ester of 1.4-bis(4-carboxyphenoxy)butane is converted to the bis(hydroxyethyl) ester by interchange using 3.1 parts (0.05 mole) of ethylene glycol and 0.003 part (0.000012 mole) of manganous acetate tetrahydrate following the procedure of Example II. Thereafter 0.54 part (0.0022 mole) of pure 4,4'-bibenzoic acid is added to the reaction mass which is then heated at 275° C. for 1½ hours in an atmosphere of nitrogen. During this time, water is distilled out and a clear melt is obtained. After adding 0.003 part (0.00001 mole) of antimony trioxide, the temperature is raised to 283° C. and the pressure reduced to 0.2 mm. of mercury for 2 hours. The copolyester product has an inherent viscosity of 0.41. Cold-drawn fibers pulled from a molten pool of polymer have a crystalline melting point of 208° C.

Example VII

This bis(hydroxethyl) bibenzoate monomer used in this example is prepared by reacting 4,4'-bibenzoyl chloride with excess ethylene glycol in the presence of excess calcium carbonate, heating the mixture to complete the reaction and thereafter purifying by recrystallization as taught in Example V.

A mixture of 6.60 parts (0.020 mole) of the monomer so prepared and 4.00 parts (0.018 mole) of 5-t-butylisophthalic acid is heated at 275° C. in a nitrogen atmosphere for 5 minutes. During this time, water distills out rapidly and a clear melt is obtained. The pressure is reduced to 15 mm. of mercury for 2 minutes to remove the last of the water. After adding 0.003 part (0.00001 mole) of antimony trioxide, the temperature is raised to 283° C. and the pressure is reduced to 0.2 mm. of mercury for 3 hours. The copolyester obtained has an inherent viscosity of 0.30. Cold-drawn fibers of this polymer have a crystalline melting point of 209° C.

When the procedure recited above is modified by the use of 0.0056 part (0.0001 mole) of potassium hydroxide as a component of the monomer mixture, a decrease in ether content of the product is noted.

Example VIII

A mixture of 7.77 parts (0.04 mole) of dimethyl terephthalate, 4.96 parts (0.08 mole) of ethylene glycol, 1.80 parts (0.02 mole) of tetramethylene glycol and 0.007 part (0.00003 mole) of manganous acetate tetrahydrate are heated at 197° C. for 4 hours, distilling out methanol. The temperature is then raised to 222° C. for 15 minutes whereupon 4.98 parts (0.03 mole) of terephthalic acid and 0.04 part (0.000014 mole) of antimony trioxide are added, the temperature is raised to 265° C. for 1½ hours and then with nitrogen being bubbled through the reaction mixture, to 283° C. for 1 hours to expel water vapor. Polymerization is carried out at 283° C. under a pressure of 0.3 mm. of mercury for 3½ hours. The copolyester obtained has an inherent viscosity of 0.35. A fiber pulled from a molten pool of polymer at 205° C. is cold-drawn to form a crystalline monofil.

Example IX

A mixture of 11.44 parts (0.045 mole) of bis(hydroxyethyl) terephthalate prepared as described in Example I and 0.84 part (0.0057 mole) of phthalic anhydride is heated at 245° C. with nitrogen bubbling through the melt for ¾ hour to expel water from the mixture. Thereafter pressure is reduced to 15 mm. of mercury for 10 minutes, 0.004 part (0.000014 mole) of antimony trioxide is added and polymerization is completed by heating for 2½ hours at a temperature of 283° C. under a pressure of 0.5 mm. of mercury. Glycol and a small amount of solid distill from the mixture during polymerization. The hard white copolyester product has an inherent viscosity of 0.41. A fiber pulled from a molten pool of polymer is crystallized by cold-drawing. The fiber has a crystalline melting point of 239° C., and a relatively high ether content.

When the procedure recited above is modified by the use of 0.015 part (0.00007 mole) of sodium terephthalate as a component of the monomer mixture, the ether content of the product is reduced.

Example X

A mixture of 12.7 parts (0.05 mole) of pure bis(hydroxyethyl) terephthalate prepared as described in Example I, 2.07 parts (0.0125 mole) of terephthalic acid, and 0.011 part (0.00005 mole) of magnesium acetate tetrahydrate is heated at 283° C. for 20 minutes, to expel water and form a clear colorless melt. The pressure is then reduced to below 0.5 mm. of mercury and the temperature is held at 283° C. for 4 hours. The fiber-forming polymer thus obtained has an inherent viscosity of 0.62 and a crystalline melting point of 262.5° C. (indicating an ether content of 1.0%).

When the procedure recited above is modified by the substitution of 0.011 part (0.00005 mole) of zinc acetate dihydrate for the magnesium acetate, the final polymer has an inherent viscosity of 0.57 and a crystalline melting point of 257.5° C. (indicating an ether content of 2.7%).

*Example XI*

A mixture of 5.07 parts (0.010 mole) of bis(6-hydroxyhexyl) sulfonyldibenzoate monomer as described in Example V, 0.22 part (0.0011 mole) of sebacic acid, 0.002 part (0.000007 mole) of antimony trioxide, and 0.005 part (0.000037 mole) of sodium acetate trihydrate is heated at 283° C. for 15 minutes, to distill out water, producing a hazy melt. The pressure is then reduced to 0.5 mm. of mercury and the temperature is held at 283° C. for 2 hours. The resulting copolyester has an inherent viscosity of 0.48. Fibers pulled from the molten polymer and drawn at 70° C. have a crystalline melting point of 257.5° C.

When the procedure recited above is modified by omission of the sodium acetate, the product is darker in color and has a crystalline melting point of 255.5° C., indicating higher ether content. The inherent viscosity is 0.40.

As will be apparent from the examples, after formation of the bis-(hydroxyalkyl) ester of aromatic dicarboxylic acid and the mixture of the said ester is an appropriate molar ratio as recited with a dicarboxylic acid, a relatively low temperature condensation at atmospheric pressure is conducted until sufficient water is removed to provide a homogeneous melt. A lower pressure is sometimes advantageous to remove the last traces of water. A higher temperature may sometimes be useful in speeding up completion of this step. A low pressure, relatively high temperature polymerization of the melt, in an inert atmosphere follows until a high molecular weight product is obtained. A polymer of fiber-forming molecular weight is indicated when a glass rod, touched to the surface of the melt and thereafter withdrawn, pulls away polymeric fibers from the molten surface.

The temperature for the low temperature condensation is above about 150° C. and at least slightly above the melting point of the monomer mixture components. For the preparation of polyethylene terephthalate a temperature in the range of from about 220° C. to about 300° C. is suitable with final pressures being below about 10 mm. of mercury. For the polymerization, it is preferred to operate at a temperature of at least about 280° C. and at a pressure of no higher than about 5 mm. of mercury. Generally such a polymerization is complete in about 2 hours, the product being very nearly pure white in color.

The bis-(hydroxyalkyl) ester of any aromatic dicarboxlic acid may be used as a component of the monomer reaction mixture. It is preferred to use such ester of those aromatic dicarboxylic acids wherein the carboxyl groups are separated by at least 4 nuclear carbon atoms (where the carboxyl groups are attached to the same or a fused aromatic ring) and at least 8 nuclear carbon atoms (where the carboxyl groups are attached to separate rings). Thus, such carboxyl groups will be situated para to each other when attached to the same phenylene radical or in the p,p'-positions if they are attached to different but attached rings. Examples of aromatic dicarboxylic acids the bis-(hydroxyalkyl) esters of which may be used in the present invention include para-phenylene dicarboxylic acids, biphenyl-4,4'-dicarboxylic acids, α,ω-diphenylalkane-4,4'-dicarboxylic acids, α,ω-diphenoxyalkane-4,4'-dicarboxylic acids, p,p'-sulfonyldibenzoic acid, and 1,5-, 2,6-, and 2,7-naphthalene dicarboxylic acids.

The bis(hydroxyalkyl) esters of aromatic dicarboxylic acids may be prepared by any one of several different routes. For example, bis(hydroxyethyl) terephthalate may be made by an ester exchange reaction between dimethyl terephthalate and ethylene glycol. It may also be prepared by a high temperature, pressure reaction between terephthalic acid and ethylene glycol. In another process, terephthaloyl chloride is reacted with at least 10 moles of ethylene glycol containing not more than 2% water in the presence of an acid acceptor such as the alkali and alkaline earth oxides, hydroxides, carbonates, and bicarbonates. It may also be prepared by dissolving hexachloro-p-xylene in at least 10 moles of ethylene glycol containing 0.05 to 5.0% water at a temperature of 100° C. or above and effecting reaction at a temperature of 125° C. or above, while neutralizing the byproduct hydrogen chloride by addition of an inorganic base. The reaction of ethylene oxide with terephthalic acid in an aqueous medium in the presence of a small amount of a salt of terephthalic acid (as in Br. 623,669) may also be used. Analogous methods of preparation are available for other aromatic dicarboxylic acids.

The ester described above is polymerized with at least about 10 mole percentage (based on moles of the said ester) of an esterifiable dicarboxylic acid. Any esterifiable dicarboxylic acid is suitable. Aliphatic acids such as adipic and sebacic may be used, as well as unsaturated aliphatic acids such as maleic acid. Cyclic anhydrides may be used instead of the acids, as in the case of maleic anhydride and phthalic anhydride. Especially high melting film- and fiber-forming polymers are formed when acids are chosen which are aromatic and have their carboxylic groups separated by 3 or more nuclear carbon atoms, for example, terephthalic acid, isophthalic acid, bibenzoic acid, and bis(carboxyphenyl) ether. For polymers with highest melting points, the acid should be the same as the acid in the coreacting ester. Mixtures of acids may also be employed.

As recited previously, the bis(hydroxyalkyl) esters are reacted with the dicarboxylic acid in a mole ratio not less than 1.00/0.90 there being at least about 0.1 mole of dicarboxylic acid present per mole of ester. The stoichiometry of the reaction calls for the use of equal molar proportions of the two reactants but it has been found in practice that the molecular weight of the polymer is low unless the ratio of ester to acid is at least 1.00/0.90. Use of a higher ratio has the additional advantage of reducing loss of acid and equipment fouling through sublimation. Because of the excess of ester, some glycol is removed, along with water, during the course of the condensation and polymerization steps. However, when the specified ratio of ester to acid is employed, the amount of glycol removed is quite small. The ratio may, of course, be larger than this value, and ratios as great as 1.00/0.10 have been used for introducing into the polymer a small amount of a modifying acid.

For polymer of good color, it is important that the dicarboxylic acid be pure. Procedures for purifying such acids are well known to the art. For the case of terephthalic acid, the crude material may be purified by dissolving it in alkali, treating with finely-divided carbon, and regenerating with acid. Recrystallization of the diammonium salt of the crude acid followed by regeneration with acid is an alternative procedure as is the high temperature precipitation from water described in British Patent 750,806. If purification is effected from nitrogen-containing solvents such as N-methyl pyrrolidone, care should be taken to remove all of the solvent, since even traces of nitrogen-containing compounds lead to polymer having poor color.

In a preferred embodiment, the reactant monomers are terephthalic acid and bis(hydroxyethyl) terephthalate. For certain purposes, e.g., dyeability, it may be desirable to have units other than these deliberately present. Examples of modifying ingredients that may be used are sodium dicarboxybenzene sulfonate, isophthalic acid, bibenzoic acid, sebacic acid, and other aromatic and aliphatic dicarboxylic acids; tetramethylene glycol, pentaglycol, polyethylene oxide glycol, and other aliphatic glycols; and hydroxy acids such as hydroxyethyl benzoic acid. While aliphatic ethers such as diethylene glycol and polyethylene oxide glycol are to be avoided for general fiber and film uses, aromatic-aromatic and aromatic-aliphatic ethers are generally not harmful and such units as bis(carboxyphenyl) ether and 1,4-bis(carboxyphenoxy) butane may be employed to alter the polymer properties. Monofunctional reactants such as β-napthoic acid may be present in minor amounts if desired to limit the molecular weight. Since the production of high-quality yarn precludes the use of more than about 10% of such modifying units, and since diethylene glycol terephthalate units are in the nature of such modifiers, it is particularly advantageous that the ether content of the final polymer be low when using polymer modifiers to increase dyeability and the like. While certain prior art processes have provided methods for producing polyethylene terephthalate in about 4 to 10 hours having an ether content of about 2–3%, it has hitherto not been possible to obtain in a short time polymer having an ether content of 1.5% or less, such as is provided by the process of this invention.

As illustrated in the examples, metals and metal compounds capable of reacting with dicarboxylic acid under the conditions of reaction are suitable for reducing side reactions and inhibiting the formation of ethers in the process of the present invention, provided that the metal has an atomic number less than 26. These materials are effective when employed in amounts of from about 0.01 to 0.30 mole percent based on the ester glycol. The use of about 0.05 mole percent of inhibitor is preferred. The inhibitor may be added prior to the ester exchange step, in which case it also acts as an ester exchange catalyst. Among suitable materials for this purpose are sodium, sodium methoxide, sodium acetate, sodium dicarboxylate, manganous acetate, and calcium acetate. It is preferred to use the manganous compound since this has better solubility in the molten polymer and leaves no color in the polymer. Fibers produced from such polymer are of low ether content.

A conventional polymerization catalyst such as antimony trioxide is ordinarily used. This is preferably added just before the low pressure step, but it may also be present in, or added to, the monomer mixtures.

Moderate amounts of inert additives may be present if desired during the reaction. These include organic chemicals such as aliphatic and aromatic hydrocarbons and finely-divided solid materials such as silica or titanium dioxide.

Polymers prepared in accordance with the present process may be formed by the conventional methods of spinning and casting into shaped articles such as films, tapes, fibers, bristles, and the like. These can be used in the preparation of yarns, woven and non-woven fabrics, papers, leathers, and other structures by methods well known to the art.

Many other modifications will be apparent to those skilled in the art from the reading of the above without a departure from the inventive concept.

I claim:
1. A process for the preparation of a synthetic fiber-forming linear polyester in which the recurring ester linkages are an integral part of the polymer chain which comprises polymerizing a mixture consisting essentially of (A) a monomeric bis(hydroxyalkyl) ester of an aromatic dicarboxylic acid, the alkyl substituent of said bis(hydroxyalkyl) ester having the formula —$(CH_2)_n$—, where $n$ is an integer from 1–10 and (B) a dicarboxylic acid, the molar ratio of said ester to said acid being at least 1.0:0.9, with at least 0.1 mol of dicarboxylic acid being present per mol of said ester, the polymerization being conducted at a temperature of at least about 220° C. in the presence of at least about 0.01 mol percent, based on the ester glycol and sufficient to reduce ether formation, of a basic salt of a metal having an atomic number less than 26 and capable of reacting with the dicarboxylic acid under the conditions of reaction, said polymerization being continued until the product has an inherent viscosity of at least 0.3 in a mixture of 60% phenol and 40% sym.-tetrachloroethane.

2. The process of claim 1 wherein the said ester is bis(hydroxyethyl) terephthalate.

3. The process of claim 2 wherein the said acid is terephthalic acid.

4. The process of claim 2 wherein the said acid is isophthalic acid.

5. The process of claim 1 wherein the said ester is the hexamethylene glycol ester of p,p′-sulfonyl-dibenzoic acid.

6. The process of claim 5 wherein the said acid is hexahydroterephthalic acid.

7. The process of claim 1 wherein the said ester is the ethylene glycol ester of 1,4-bis(4-carboxy-phenoxy) butane.

8. The process of claim 7 wherein the said acid is 4,4′-bibenzoic acid.

9. The process of claim 1 wherein the said ester is the ethylene glycol ester of 4,4′-bibenzoic acid.

10. The process of claim 9 wherein the said acid is 5-t-butyl-isophthalic acid.

11. The process of claim 1 wherein the said ester is a bis(hydroxyethyl) ester.

12. The process of claim 1 wherein the carbonyl carbons of the ester linkages of the said ester are separated by at least four nuclear carbon atoms.

13. The process of claim 1 wherein the component (B) is an anhydride.

14. The process of claim 1 wherein the said basic salt is the manganous salt of an aromatic dicarboxylic acid.

References Cited in the file of this patent

UNITED STATES PATENTS

| | | |
|---|---|---|
| 2,465,319 | Whinfield | Mar. 22, 1949 |
| 2,711,402 | Fletcher | June 21, 1955 |
| 2,720,502 | Caldwell | Oct. 11, 1955 |
| 2,720,506 | Caldwell et al. | Oct. 11, 1955 |
| 2,740,768 | Sullivan | Apr. 3, 1956 |
| 2,799,664 | Drewitt | July 16, 1957 |

FOREIGN PATENTS

| | | |
|---|---|---|
| 552,699 | Belgium | Dec. 15, 1956 |
| 742,196 | Great Britain | Dec. 21, 1955 |
| 775,030 | Great Britain | May 15, 1957 |